US006353227B1

(12) United States Patent
Boxen

(10) Patent No.: US 6,353,227 B1

(45) Date of Patent: Mar. 5, 2002

(54) DYNAMIC COLLIMATORS

(76) Inventor: Izzie Boxen, 117 Old Surrey Lane, Richmond Hill, Ontario (CA), L4C 6R8

(*) Notice: Subject to any disclaimer, the term of this patent is extended or adjusted under 35 U.S.C. 154(b) by 0 days.

(21) Appl. No.: 09/372,071

(22) Filed: Aug. 11, 1999

Related U.S. Application Data

(60) Provisional application No. 60/112,772, filed on Dec. 18, 1998.

(51) Int. Cl.[7] .............................. G01T 1/29; G21K 5/10

(52) U.S. Cl. .............................. 250/363.1; 250/363.06; 378/149

(58) Field of Search .......................... 250/363.1, 363.06, 250/363.07, 505.1; 378/147, 149, 154, 155

(56) References Cited

U.S. PATENT DOCUMENTS

| | | | | |
|---|---|---|---|---|
| 3,585,387 A | * | 6/1971 | Bramlet | 250/363.1 |
| 3,752,981 A | | 8/1973 | Jaszczak | |
| 3,752,982 A | | 8/1973 | Jaszczak | |
| 4,125,776 A | | 11/1978 | Tosswill et al. | |
| 4,389,729 A | | 6/1983 | Stein | |
| 4,419,585 A | | 12/1983 | Strauss et al. | |
| 4,433,427 A | | 2/1984 | Barnea | |
| 4,460,832 A | | 7/1984 | Bigham | |
| 4,688,242 A | | 8/1987 | Ema | |
| 4,752,691 A | | 6/1988 | Hawman | |
| 4,954,709 A | | 9/1990 | Zigler et al. | |
| 4,980,552 A | | 12/1990 | Cho et al. | |
| 5,021,667 A | * | 6/1991 | Genna et al. | 250/363.1 |
| 5,436,958 A | | 7/1995 | Taylor | |
| 5,448,073 A | | 9/1995 | Jeanguillaume | |
| 5,847,398 A | | 12/1998 | Shahar et al. | |

FOREIGN PATENT DOCUMENTS

| | | |
|---|---|---|
| EP | 0 247 912 | 12/1987 |
| WO | WO 82/00897 | 3/1982 |
| WO | WO 94/17533 | 8/1994 |

OTHER PUBLICATIONS

Ronald J. Jaszczak, Journal of Nuclear Medicine, vol. 14, No. 1, Jan. 1973, pp 14–20.

Ronald J. Jaszczak, Physics in Medicine and Biology, vol. 19, No. 3, 1974, pp 362–372.

Patent Abstracts of Japan, vol. 016, No. 295 (C–0957), Jun. 30, 1992.

& Jp 04 079939 A (Shimadzu Corp.), Mar. 13, 1992, abstract.

* cited by examiner

*Primary Examiner*—Georgia Epps
*Assistant Examiner*—Richard Hanig
(74) *Attorney, Agent, or Firm*—Bereskin & Parr

(57) ABSTRACT

Apparatus for collimating particle emanations, whether photons or material particles, comprises a collimator plate and a motion means. The collimator plate is made of an attenuating material capable of attenuating the particle emanations. The collimator has a plurality of apertures of defined cross-sectional diameter, cross-sectional shape and three-dimensional distribution which restricts the emanations to pass through the plate in a plurality of defined collimated beams. The motion means moves the collimator to enable the plurality of collimated beams to form a defined combined beam having a preselected cross-sectional distribution of flux, when averaged over a specified time. The resolution of the collimator is essentially the cross-sectional diameter of the apertures, which is limited only by technical manufacturing capabilities. This allows the final imaging or detecting resolution to be essentially the intrinsic resolution of the imaging or detecting device, such as a gamma camera, independent of the energy of the emanations. The collimator may also be used to produce beams of particles with predefined cross-sectional size, cross-sectional shape and cross-sectional relative flux, averaged over time, for physics experiments or other uses.

31 Claims, 12 Drawing Sheets

10e

DYNAMIC COLLIMATORS

This application claims benefit of Provisional No. 60/112,772 filed Dec. 18, 1998.

FIELD OF THE INVENTION

This invention relates to apparatus for collimating and imaging particle emanations, be they photons or material particles, and, in particular, to collimators used with gamma cameras in nuclear medicine.

BACKGROUND OF THE INVENTION

In order for Anger gamma cameras to form an image showing the distribution of radioactive material in an object or in a patient, a means is necessary to determine the location of the radioactive material. This means usually consists of a collimator attached to the face of the camera to control the direction of the detected gamma rays or other radiation emanating from the radioactive material. The control of directionality occurs at each location on the camera face by means of collimator apertures which allow gamma rays (or other radiation) through only if they come from within an acceptance angle. In a parallel-hole collimator the apertures are parallel to each other, perpendicular to the camera face, long enough and of small enough diameter that the acceptance angle is narrow. The apertures are packed closely enough together in most cases that the intrinsic resolution of the camera does not allow resolution of the apertures on the final image. The result is an acceptable 1:1 relation between direction of origin of the gamma rays and site of interaction with the camera crystal. This allows an image to be formed by film or a computer since the electronics of the camera are able to localize the site of interaction of each gamma ray with the crystal.

There are a variety of prior art collimators, each designed for specific energy gamma ray or specific use. These include, but are not limited to:

- parallel-hole
- converging(/diverging)-hole
- slant-hole (parallel apertures at an angle to the camera face)
- fan-beam (apertures converge on a line)
- pin-hole
- ("coded aperture") array of pin-holes (used for tomography)

These collimators also come with a variety of materials, aperture diameters, aperture shapes and thickness of septum (partition between apertures).

The standard apertures have cross sections that are circles, squares or hexagons. Non-standard apertures can be short slots or even slits across the full diameter of the collimator. Square holes are usually in square array, hexagonal holes are usually in hexagonal array, but round holes may be in either or even other arrays. The septa are of a dense material that has a high stopping power for the radiation in question. This radiation is usually gamma rays, but collimators may also be used for x-rays, electrons, protons, neutrons, other particles or even visible light. For gamma rays, as for other radiation, the higher the energy the greater the penetration through the material of the collimator. The septa are usually made of lead, since lead is very dense, cheap and easy to work with. However, in situations where septa are thin, a lead collimator is very soft and easily distorted, even by a finger touch. Lead, being soft, does not lend itself well to precision collimators. Tungsten, an extremely hard and dense metal, machinable to fine tolerances (0.005" or better) is often used where thin septa and/or fine tolerances are wanted. However, tungsten collimators are much more expensive than lead ones.

For a given energy gamma ray and physical distribution of the radioactive material, image resolution with an Anger gamma camera is determined by the collimator, size of scintillation pulse in the crystal produced by the gamma ray (typically of the order of 1 mm diameter for 140 keV photons interacting in a NaI(Tl) crystal) and by the ability of the electronics to localize the pulse (i.e. determine the (x,y) coordinates). The resolution capability of the camera without the collimator is called its intrinsic resolution $R_i$ and is typically about 3 mm or slightly better for recent prior art Anger gamma cameras imaging the 140 keV photons of technetium−99m ($^{99m}$Tc, 99m-Tc, Tc−99m). The resolution capability of the collimator, $R_c$, is determined by how well it produces the 1:1 relation between directional origin of the gamma rays (or other radiation) and the site on the camera face that these gamma rays reach. Intrinsic camera resolution degrades with increasing crystal thickness and, for statistical reasons, with lower energy gamma rays. For a parallel-hole collimator, resolution $R_c$ is determined for given collimator material and imaged object position by septum thickness, aperture diameter and aperture length. For higher energy gamma rays and fixed aperture length the septa must be thicker to prevent penetration of the gamma rays through the septa. This results in $R_c$ for higher energy gamma rays being of the order of or larger than $R_i$. The intrinsic and collimator resolutions combine to give a net resolution given approximately by $R=(R^2_i+R^2_c)^{1/2}$. To this must also be added the effect of unwanted photons (scattered and other extraneous photons), a background that results in further blurring of the image. The final resolution is typically at least 2–3 times worse than the intrinsic resolution of the camera for higher energy 364 keV photons of iodine−131 ($^{131}$I, 131-I, 1−131), and even worse for the 511 keV annihilation photons of positron emitters. This resolution is much worse than seen with x-rays, CT, MRI and often even with ultrasound imaging. A 1 cm lesion, deep in the liver resulting in a cold (i.e. non-radioactive) defect with radionuclide imaging, is difficult to detect with an Anger gamma camera, even with 99m-Tc. This is in contrast to the trivially easy imaging detectability of a radioactive point source against a cold background.

Pin-hole collimators are often used in an attempt to improve resolution of single body site imaging, but these collimators have limitations which often allow for only slight improvement. The size of the pin-hole aperture cannot be made arbitrarily small because of penetration of gamma rays through the thin edges of this aperture. Pin-hole collimators also allow very few photons through to the camera, giving a low sensitivity of photon detection. Collimator sensitivity for given photons is defined as the fraction or percent of these photons that reach the camera face with the collimator in place in comparison with the number that would reach the camera face without the collimator in place. Low collimator sensitivity can increase imaging time unreasonably. In fact, since image resolution also depends through statistical formulae on two-dimensional density of crystal interaction sites, the resolution is often worse with a pin-hole collimator than with a parallel-hole collimator. There is also geometric distortion of size and distortion of relative position in a pin-hole image.

There is accordingly a need for a collimator having improved resolution with adequate sensitivity and no image distortion for use with prior art Anger gamma cameras.

There is also a need for a collimator which is adapted for use with the applicant's fiber optic gamma camera, having improved intrinsic resolution over prior art gamma cameras, which is the subject of the applicant's co-pending U.S. patent application entitled "Fiber Optic Gamma Camera", filed on even date under Ser. No. 09/372,128, now U.S. Pat. No. 6,271,510.

SUMMARY OF THE INVENTION

The present invention is directed towards apparatus for collimating particle emanations, such as gamma rays emanating from a radioactive source. The apparatus comprises a collimator plate made of an attenuating material capable of attenuating particle emanations, collimator plate having a plurality of apertures of defined diameter, shape and three-dimensional distribution for restricting the emanations to pass through in a plurality of defined collimated beams; and motion means for moving the collimator plate in a manner which enables the plurality of collimated beams to form a defined combined beam having a pre-selected cross-sectional distribution of flux, when averaged over a specified time.

One aspect of the invention is a collimator apparatus for use with an imaging device, such as a gamma camera, for capturing on a planar imaging face images created by radioactive emanations, such as gamma rays, from a radioactive source.

In the preferred embodiment the apertures are of such shape and distribution that continuous or stepwise linear motion yields a uniform and complete sampling of the two-dimensional image space of the gamma rays. In a second embodiment the shape and distribution of the apertures are such that a rotational motion accomplishes the same. The rotation may be of a plate collimator about an axis perpendicular to it and through its center. For a cylindrical or cylindrical arc collimator the rotation may be about its central axis. Ignoring the effect of scattered and other extraneous photons, the shape and size of the apertures are also such as to allow the final image resolution to be essentially the intrinsic resolution of the camera, whether a prior art gamma camera or a fiber optic gamma camera. Another embodiment in plate form requires movement in both the x and y-direction in the plane of the collimator. Since these collimators must be moved in relation to the gamma camera face in order to allow acceptably uniform and complete image space sampling and to allow attaining of the improved resolution over prior art collimators, the disclosed collimators will be called dynamic collimators.

Dynamic collimators may also be used with non-radioactive emanations or other imaging/detecting apparatus. The dynamic collimators may be us ed to form beams of radioactive or non-radioactive emanations which are of prescribed cross-sectional size, shape and relative flux. This cross-sectional flux may be uniform, of radial symmetry or of prescribed relative distribution in one direction while uniform or even of another prescribed relative distribution in the perpendicular direction.

BRIEF DESCRIPTION OF THE DRAWINGS

The invention will now be described by way of example only, by reference to the following drawings, in which.

DETAILED DESCRIPTION OF PREFERRED AND ALTERNATIVE EMBODIMENTS

Figure 1A:
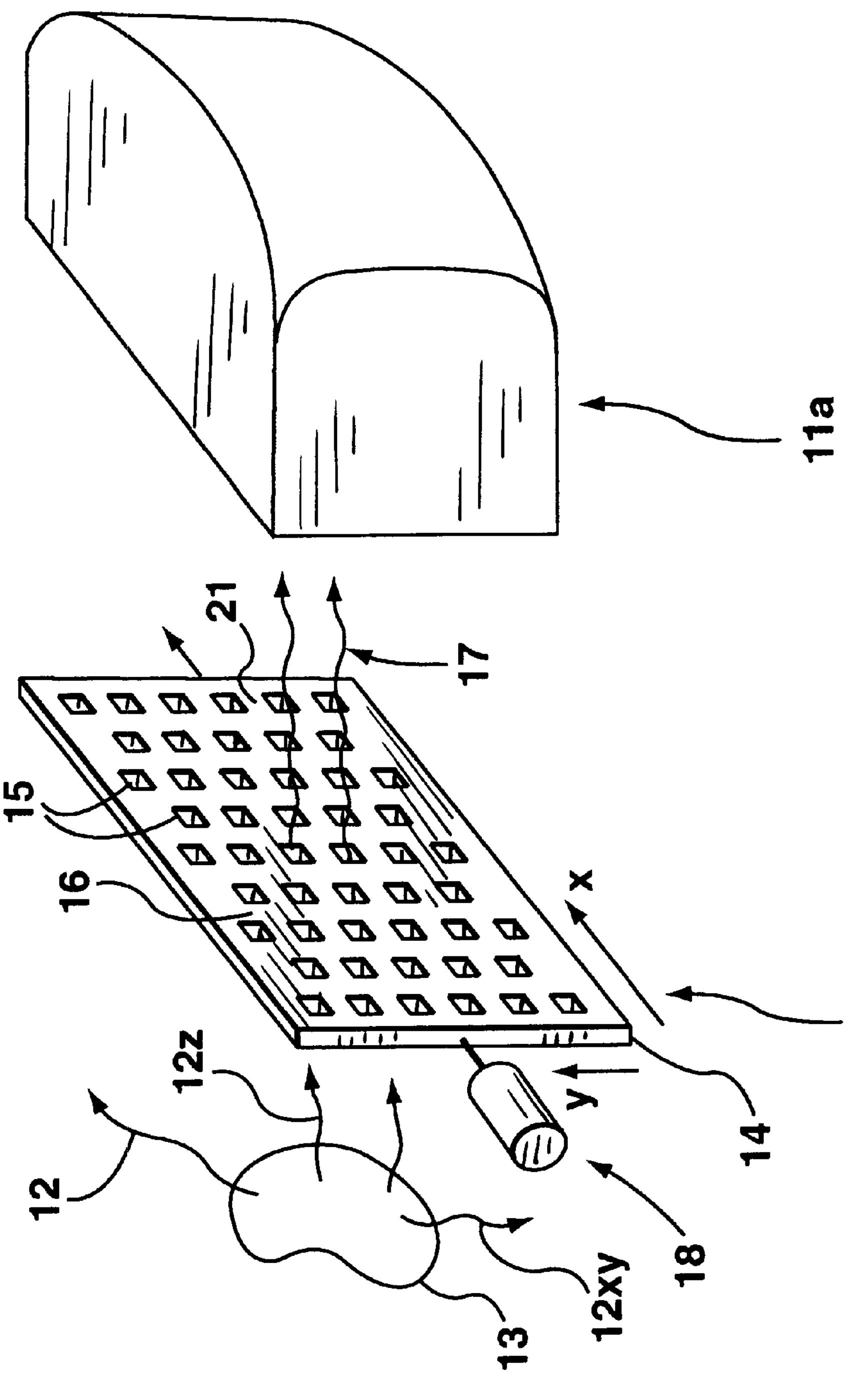
FIG. 1*a* is a diagrammatic perspective view of a dynamic collimator made in accordance with a preferred embodiment of the present invention, shown undergoing linear motion in front of the face of a conventional gamma camera.
Figure 1B:
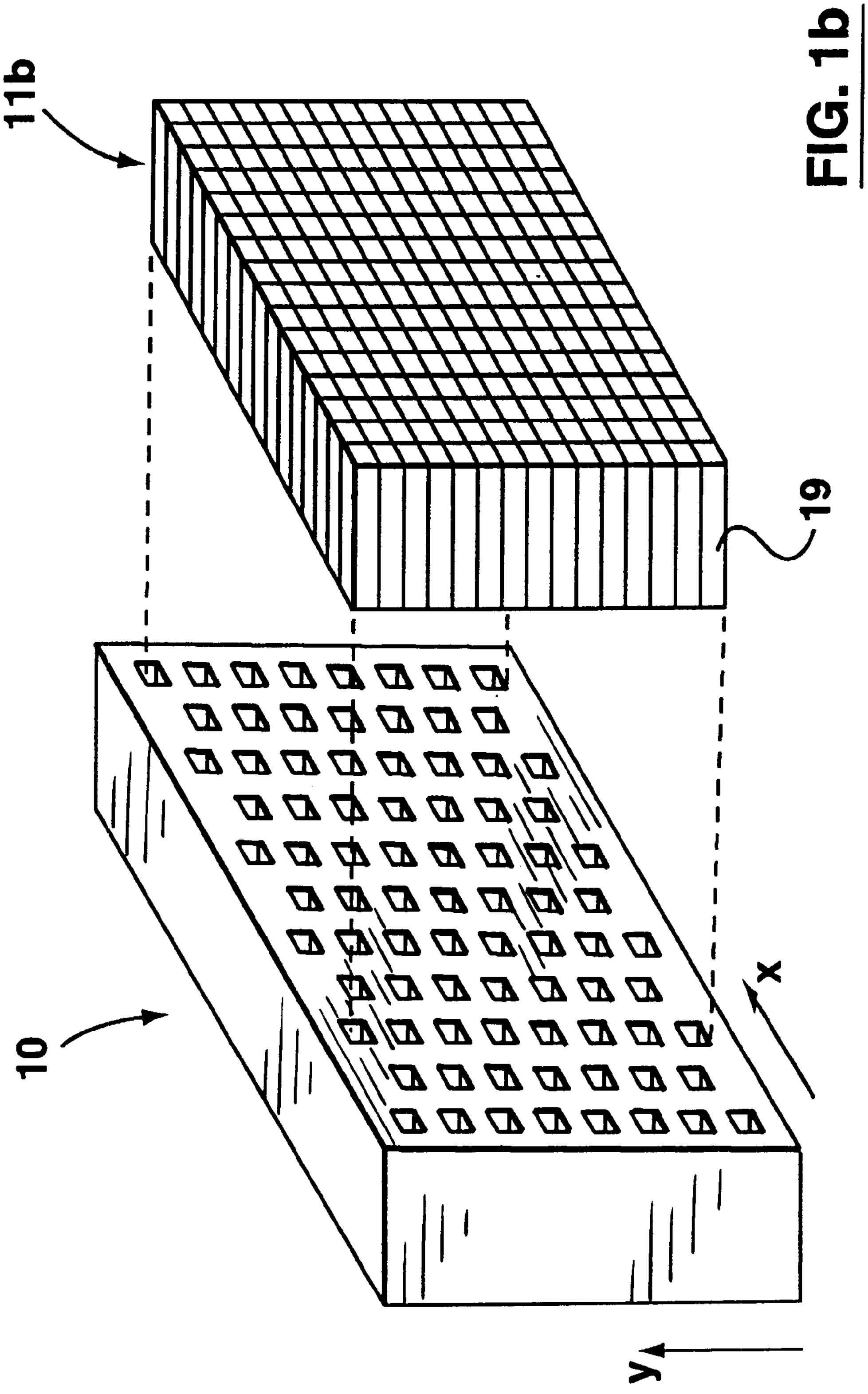
FIG. 1*b* is a diagrammatic perspective view of the preferred embodiment of the subject invention shown positioned in front of the scintillation fiber optic plate of a fiber optic gamma camera.
Figure 2A:
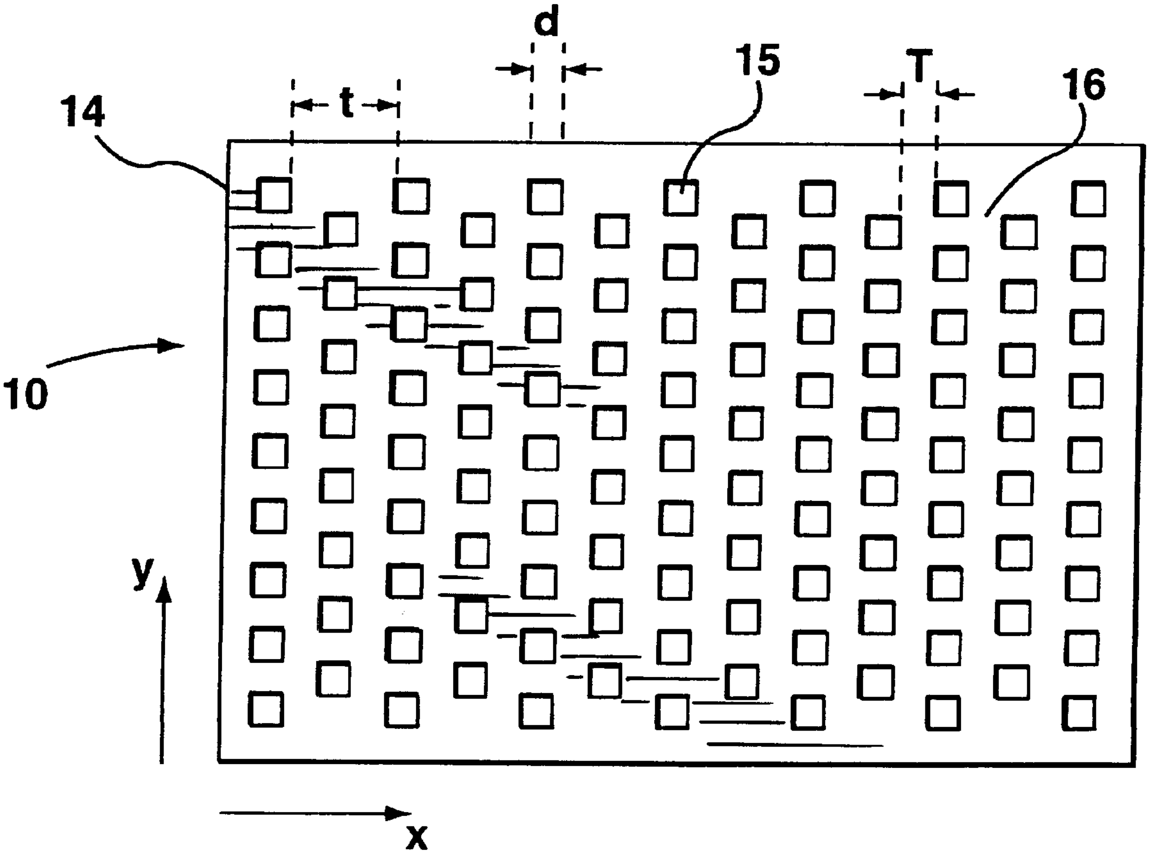
FIG. 2*a* is a diagrammatic front view of the collimator plate shown in FIGS. 1*a* and 1*b;*

Referring to FIGS. 1*a*, 1*b* and 2*a*, illustrated therein is dynamic collimator apparatus 10 made in accordance with a preferred embodiment of the subject invention. Gamma camera 11*a* captures the images created by gamma rays 12 emitted from radiation source 13, typically a radionuclide put into a patient. As used herein, the term "gamma ray" includes x-rays and other ionizing radiation.

Dynamic collimator apparatus 10 comprises a collimator plate 14 extending in an x-y collimator plane, made of lead or other gamma ray absorbing material, and motion means 18. Collimator plate 14 comprises a plurality of apertures 15 arrayed in rows and columns. Adjacent apertures 15 are separated by septa 16 of sufficient width and thickness to absorb incident off-axis gamma rays 12. Axi a gamma rays 12*z* traveling in the z-direction pass through apertures 15, thereby creating a collimated beam of gamma rays 17, at collimator plate exit face 21. The preferred embodiment of dynamic collimator apparatus 10 consists of square apertures 15 of diameter, with sides parallel to the x and y directions.

Motion means 18 prefer ably comprises an electric motor, controlled by a servo-mechanism or computer, operatively coupled to collimator plate 14, which is capable of moving plate at a continuous speed or in stepwise fashion, in a manner hereinafter described.

The diameter, shape and distribution of apertures 15, and the manner of motion of motion means 18, are preferably selected to form a combined beam of gamma rays 17, having a uniform or substantially uniform cross-sectional distribution of flux. The term “uniform flux” designates relative time-averaged flux at the beam exit face of collimator plate 14 which is the same as if collimator 10 were absent. “Substantially” uniform flux designates relative time-averaged flux which is uniform within the resolution capabilities of the detection system used. However, collimator plate 14 can be configured to produce collimated beams having non-uniform distribution of flux.

Figure 2B:
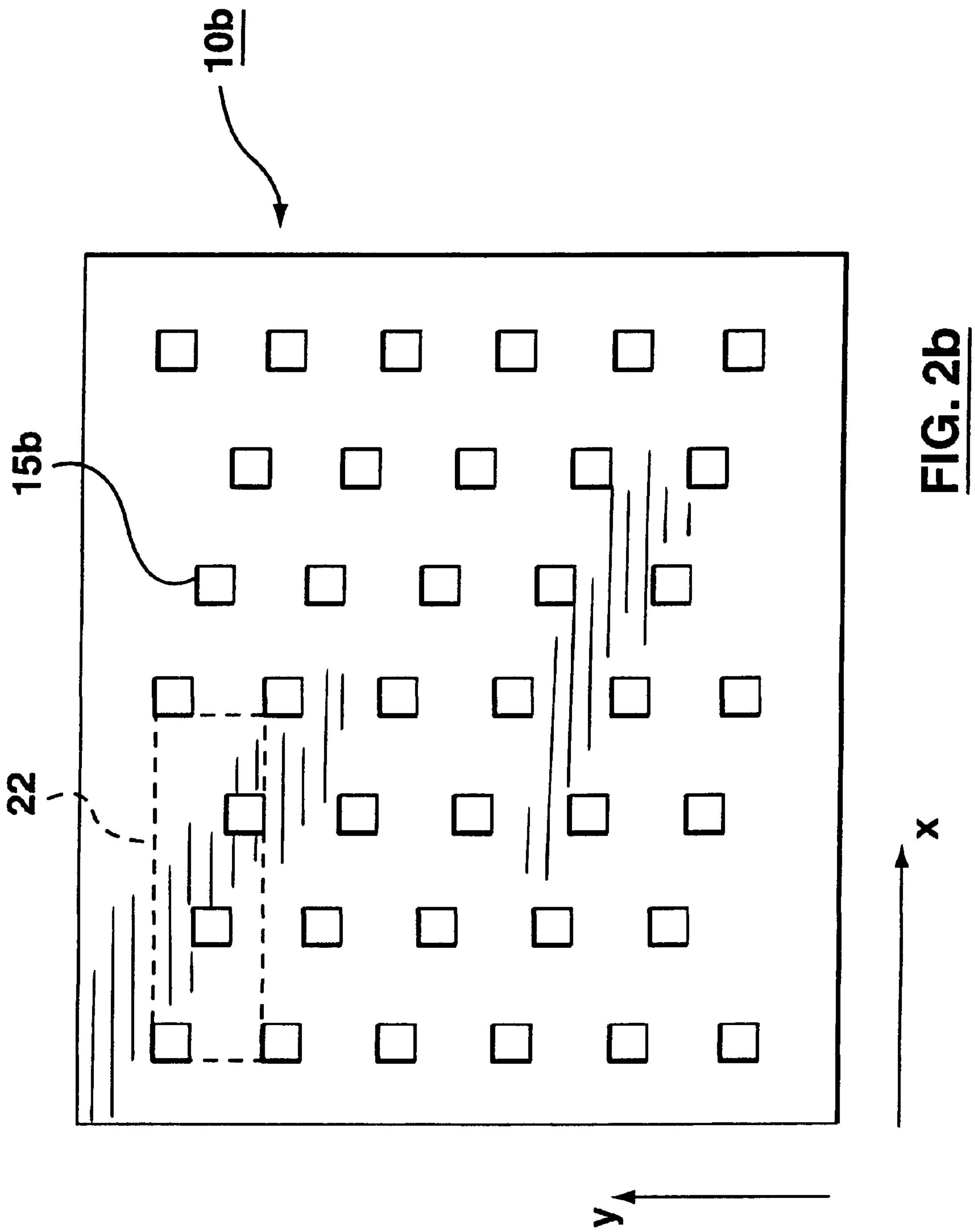
FIG. 2*b* is a diagrammatic front view of a dynamic collimator having the same basic pattern of apertures as in FIG. 2*a*, but modified to allow improvement in resolution by a factor of 2.

If the gamma camera is a fiber optic gamma camera, whose scintillation fiber optic plate 11*b* is shown in FIG. 1*b*, then the preferred embodiment of dynamic collimator 10 has apertures 15 with diameter d the same as the diameter of the scintillating optical fibers 19, as disclosed in the applicant’s aforementioned co-pending U.S. patent application Ser. No. 09/372,128, now U.S. Pat. No. 6,271,510, which is incorporated herein by reference. During image acquisition at each step the apertures 15 are then also superimposed in position in the x-y plane on the scintillating optical fibers 19, which are square, in square array and aligned with sides parallel to the x and y-directions. The illustrations in FIGS. 1*a*, 1*b* and 2*a* show the apertures 15 in adjacent rows to be separated from each other in the x-direction by septum of thickness T=d and the apertures 15 in the same row to be separated from each other in the x-direction by distance t=3d. In general, in the preferred embodiment, if the apertures 15 in adjacent rows are separated from each other in the x-direction by septum of thickness T=nd, then the apertures 15 in the same row are separated from each other in the x-direction by distance $t=([n+1]^2-1)d$. FIG. 2*b* depicts a collimator 10*b* having apertures 15*b* arranged in unit cells 22 and illustrates the pattern of apertures for n=2. The rows are also staggered so that the minimal separation T=nd between apertures 15*b* also holds in the y-direction. For a fiber optic gamma camera with scintillation fiber optic plate 11*b*, n is a positive integer. For prior art Anger gamma camera 11*a*, n must still be integral for the separation of apertures 15 in any column, but n need not be integral for the separation of apertures 15 in the rows.

Consider, first, n an integer. Dynamic collimator 10 is moved in the x-direction by motor means 18. For prior art Anger gamma camera 11*a*, this motion may be uniformly linear or in equally-timed (with respect to image acquisition) steps of equal size d. For scintillation fiber optic plate 11*b* of a fiber optic gamma camera, this motion is best in equally-timed steps of equal size d. For total distance covered $t+d=(n+1)^2d$, the image space sampling of gamma rays 12*z* is complete as well as uniform. Note that the sensitivity of such a dynamic collimator 10 varies inversely as $(n+1)^2$. Further motion may then be to cover total distance t+d in the positive or negative x-direction for each imaging pass. Unidirectional or bidirectional motion in the x-direction covering distance t+d each pass may be continued until a sufficient number of photons are detected to result in an acceptable image. If the total number of passes is large, then the final pass need not be complete in order to maintain acceptable visual uniformity in the final image. Collimator 10 must have dimensions large enough, especially in the x-direction, that at no time during such motion is the camera face not covered by collimator 10, in order to avoid lack of uniformity over the camera face. Bidirectional motion would allow for economy of collimator 10 size in direction x.

Consider now prior art Anger gamma camera 11*a*, and n not necessarily an integer for the separation of apertures in the rows. Uniformly linear motion in the x-direction yields the same results as if n were an integer. Suppose now that the linear motion in the x-direction of collimator 10 is in equally-timed steps of equal size but smaller or larger than d, to accommodate n. Then, provided the final image resolution is larger than these size steps, the lack of uniformity due to resultant gaps or redundancy in image space sampling will be too small to be noticed visually. Quantitative analysis of the images may suffer, however, if absolute and not just relative radioactive counts are important, depending on how absolute radioactive counts are determined.

For a fiber optic gamma camera with scintillation fiber optic plate 11*b* having scintillation fiber 19 shape and cross-sectional size equal to those of the apertures in the dynamic collimator, the motion must be in equally-timed steps of distance d each to avoid passage of gamma rays 17 from the same aperture 15 into two adjacent scintillating optical fibers during an imaging step, thereby degrading resolution. However, the motion may be continuous if the resulting degradation in resolution is not of concern. If the diameter of the scintillation fibers in the fiber optic gamma camera is small compared to the diameter of the apertures in the dynamic collimator, then little resolution loss will be noticed with continuous linear motion.

There is some leeway allowed in the precision of manufacturing of a dynamic collimator 10 as described hereto. For a fiber optic gamma camera with scintillation fiber optic plate 11*b*, with the center of each aperture 15 over the center of the core of a scintillating optical fiber, the diameter d of aperture 15 may be anything between the diameter of the scintillating optical fiber core and that of this core along with slightly less than twice its non-scintillating cladding, as disclosed in the applicant’s aforesaid co-pending application. This maintains maximum sensitivity of the dynamic collimator 10, while preventing passage of gamma rays 17 from the same aperture 15 into the cores of any adjacent scintillating optical fibers 19 during image acquisition for each step. If diameter d of aperture 15 is less than the diameter of the core of scintillating optical fiber 19, then collimator 10 sensitivity is reduced with no imaging benefit accruing. For prior art Anger gamma cameras 11*a*, if the apertures 15 have diameter d a bit too small or too large, resulting in some gaps or overlaps in image space sampling, this will probably not be noticed visually on the final images if d and the sizes of these gaps or overlaps are smaller than the camera intrinsic resolution. With intrinsic resolution of prior art Anger gamma cameras about 3 mm, this allows for substantial tolerance of error in manufacture of dynamic collimators 10 for use with such prior art cameras. Again, however, quantitative analysis may suffer if absolute and not relative radioactive counts detected are important. The same comments on tolerance of errors in manufacture and on qualitative and quantitative analyses of images also hold for other embodiments discussed below.

To simplify discussion, n will be considered integral hereafter. For fixed thickness of collimator plate 14, the sensitivity of dynamic collimator 10 varies inversely as $(n+1)^2$. Superficially, this appears to be independent of aperture 15 diameter d, which is also the dynamic collimator 10 resolution. However, as d decreases, n must eventually increase to avoid gamma ray 12 penetration through septa 16 of thickness T=nd, unless the collimator 10 thickness (i.e. aperture length) is increased. However, increasing collimator 10 thickness for fixed d decreases the acceptance angle and thereby the collimator 10 sensitivity. For higher energy gamma rays 12 and fixed thickness of dynamic collimator 10, T=nd must be increased to avoid septal penetration. Conversely, for lower energy gamma rays 12, T=nd may be decreased, thereby increasing sensitivity of dynamic collimator 10. A dynamic collimator 10 designed for a given energy gamma ray 12 and having resolution d has the same resolution for lower energy gamma rays 12 and can have the same resolution but higher sensitivity for lower energy gamma rays 12 by reducing n.

Note that, unlike prior art collimators, whose resolution for fixed collimator thickness (i.e. aperture length) is limited by septum thickness, dynamic collimators 10 can have arbitrarily fine resolution d, limited only by the decrease in sensitivity we are willing to tolerate and by technical limitations on collimator production.

Figure 3A:
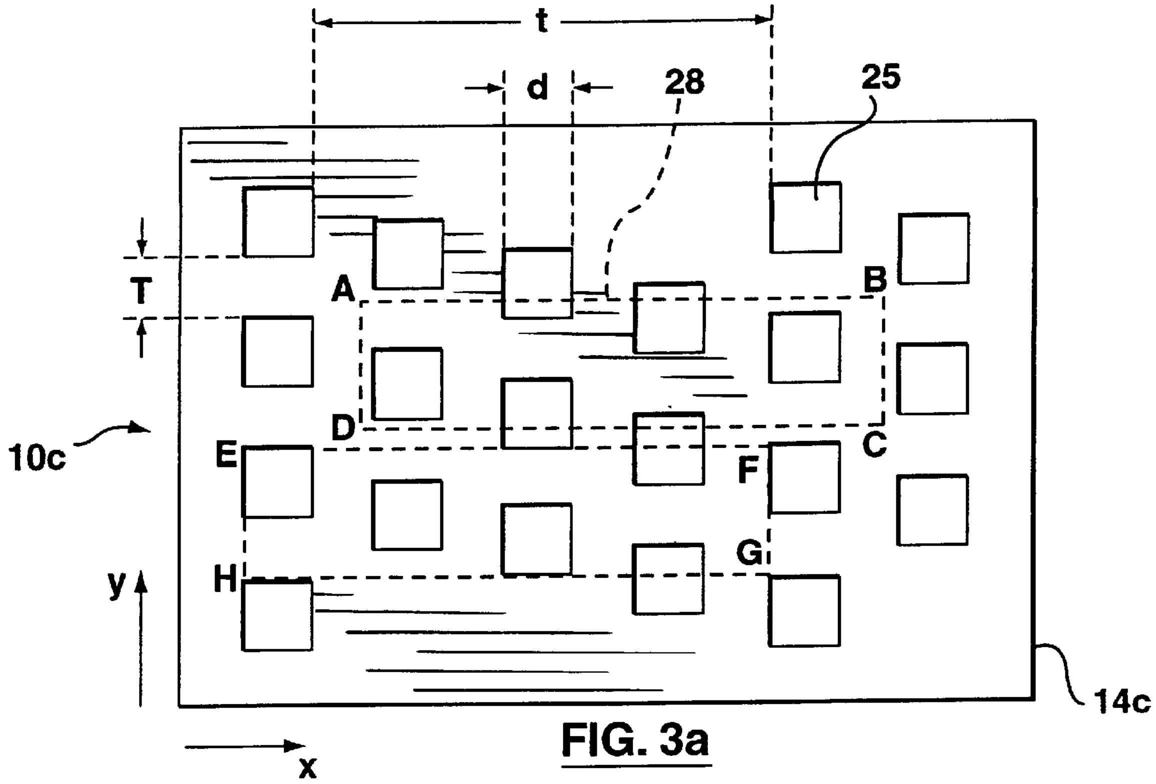
FIGS. 3*a* and 3*b* are diagrammatic front views of two alternative embodiments of the collimator plate of the subject invention.
Figure 3B:
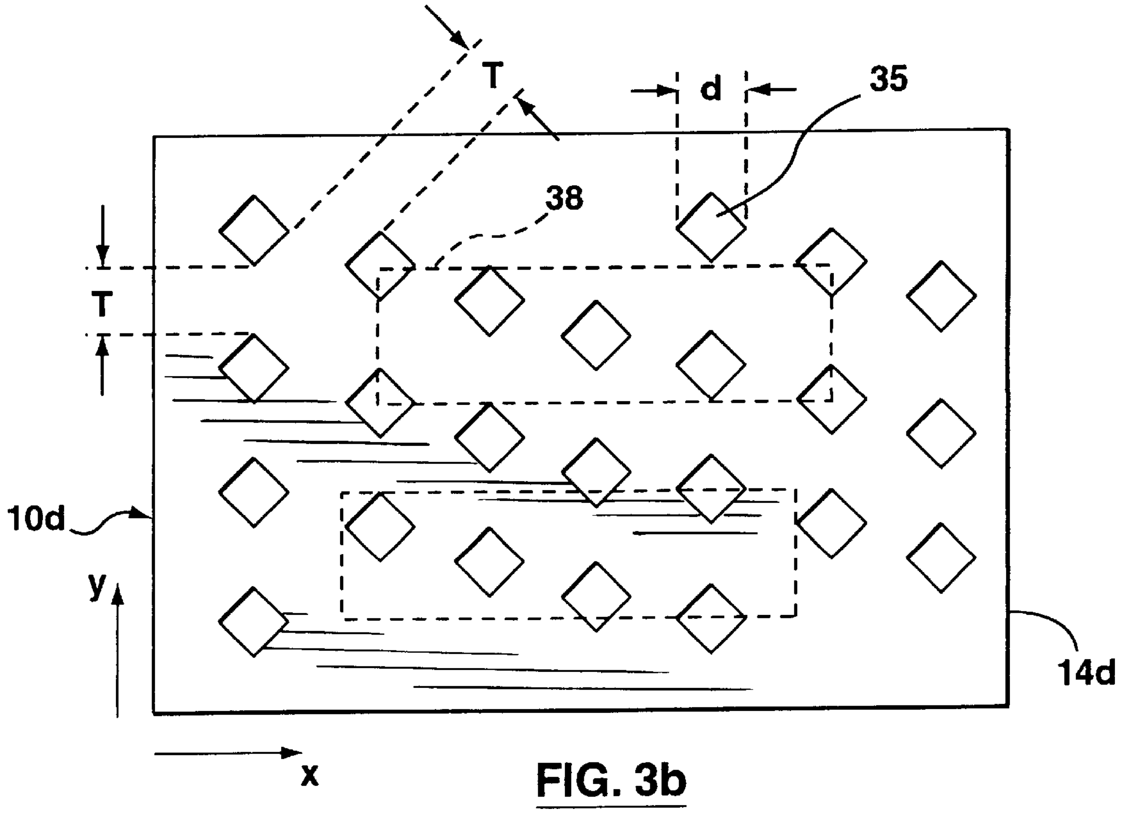

Referring now to FIGS. 3*a* and 3*b*, illustrated therein are dynamic collimators 10*c* and 10*d*, respectively, made in accordance with alternative embodiments of the invention, adapted for use with prior art gamma cameras and with linear motion in the x-direction. Collimator 10*c* comprises collimator plate 14*c* provided with apertures 25 arranged in a pattern made up of repeating unit cells 28. A unit cell is the smallest cell such that translation in a specified direction by cell dimension in that direction within an extended pattern leaves the pattern within the cell unchanged. This allows building up of the entire pattern, given a unit cell and pattern inside it. Cell 22 in FIG. 2*b*, cell 28 in FIG. 3*a* and cell 38 in FIG. 3*b* are all unit cells with patterns unchanged by translation in the x-direction by t+d and by translation in the y-direction by (n+1)d. Note that, although the orientation and size of a unit cell is fixed by the pattern, the location of a unit cell with respect to the pattern is otherwise arbitrary, as illustrated by cell 28. Unit cells 22 and 38 illustrate two commonly used locations with respect to the pattern. Similarly, collimator 10*d* comprises collimator plate 14*d* provided with apertures 35 arranged in a pattern made up of repeating unit cells 38. The general pattern of distribution of apertures 25, 35 is the same, except that the apertures 35 are rotated by 45° between the two embodiments. These patterns share an important property, call it Condition 1, with collimator 10 of the preferred embodiment illustrated in FIG. 2*a* and with collimator 10*b* having the aperture pattern illustrated in FIG. 2*b*. This property is that within each repeated unit cell of the pattern, the ratio of distance along the x-direction taken up by apertures to the total distance in the x-direction taken up by collimator is a constant and independent of position y and cell. Equivalently, Condition 1 states that within each unit cell the distance along the x-direction occupied by apertures is a constant, independent of y. This guarantees that uniform linear motion through distance t+d or motion in steps of size d and equal image acquisition time each through total distance t+d in the positive or negative x-direction results in uniform sampling of the image space. The starting x-position for these motions is immaterial, since the location of a unit cell is arbitrary. Provided collimator 10 always completely covers the imaging face of camera 11*a* or the scintillation fiber optic plate 11*b* so that the edges (i.e. incomplete cells) of collimator 10 are never in the field of view of camera 11*a*, or scintillation fiber optic plate 11*b*, the image sampling will be uniform. Conversely, if dynamic collimators are used with uniform linear motion through distance t+d or step motion of size d and equal time each through total distance t+d in the positive or negative x-direction, then Condition 1 must be satisfied, in order to have uniform image space sampling. Condition 1 is therefore a necessary and sufficient condition for uniform image space sampling with dynamic collimators used with such motions. This also allows motion to be in multiples of unit cell length in either the positive or negative x-direction and in no particular order to still have uniform image space sampling. As already pointed out above, this allows for economy in collimator size in direction x. Incidentally, the ratio in Condition 1 determines the collimator sensitivity for given collimator thickness (aperture length).

The embodiments illustrated so far are but a few that satisfy Condition 1. Apertures of triangular, hexagonal and many other shapes can also be used, but square is ideal for the fiber optic gamma camera disclosed in the applicant's aforesaid co-pending application, and square also works for prior art gamma cameras. The embodiment with square apertures and minimal allowable septum thickness T also achieves maximal collimator sensitivity, since all space outside of the minimum septum thickness T is aperture space. The embodiment in FIG. 3*a* has every other column of apertures 15 displaced in the y-direction by distance d/2 from that in the embodiment illustrated in FIG. 2*a*. The total area taken up by apertures in this embodiment remains the same as for the embodiment illustrated in FIG. 2*a*, so the collimator sensitivities for these two embodiments is the same.

For a collimator of infinite size, the same would hold in FIG. 3*a* if the y-displacement of every other column were also almost any value other than d/2. However, if the y-displacement of every other column is d, then the embodiment illustrated in FIG. 4 results. Condition 1 does not hold here. Because collimators 10 are finite and aperture diameters d are non-zero, Condition 1 is not satisfied for many other values of such y-displacements as well, specifically any that result in a cell pattern too large to fit within ½ the x-width of the camera face. Linear motion in the x-direction is then not sufficient to completely sample the image space. However, tiling of the image space by steps in both x and y-directions is still possible. For example, in FIG. 4, steps of the collimator 10*e* that carry 1 to 2 to 3 to 4 suffice to tile the image space. The alternative embodiment of collimator 10*e* illustrated in FIG. 4 has n=1. For arbitrary n, (n+1) steps through each of (n+1) consecutive rows, in either the positive or negative x-direction each, yield a complete and uniform sampling of the image space. The motions in the x-directions could also be uniformly linear for a prior art gamma camera. Tilings without redundancy using the patterns in FIGS. 3*a* and 3*b* and steps in x and y-directions are also easily devised. If each step has the same amount of image acquisition time, then uniform image space sampling results. However, movement in both the y as well as the x-direction is more complicated than movement only in the x-direction, so movement in only the (positive or negative) x-direction is preferred.

Other aperture shapes and patterns may result in some overlaps or gaps in image space sampling. Provided the sizes of these overlaps and gaps are less than the final image resolution, this lack of uniformity will probably not be noticed visually on the final images.

Figure 5A:
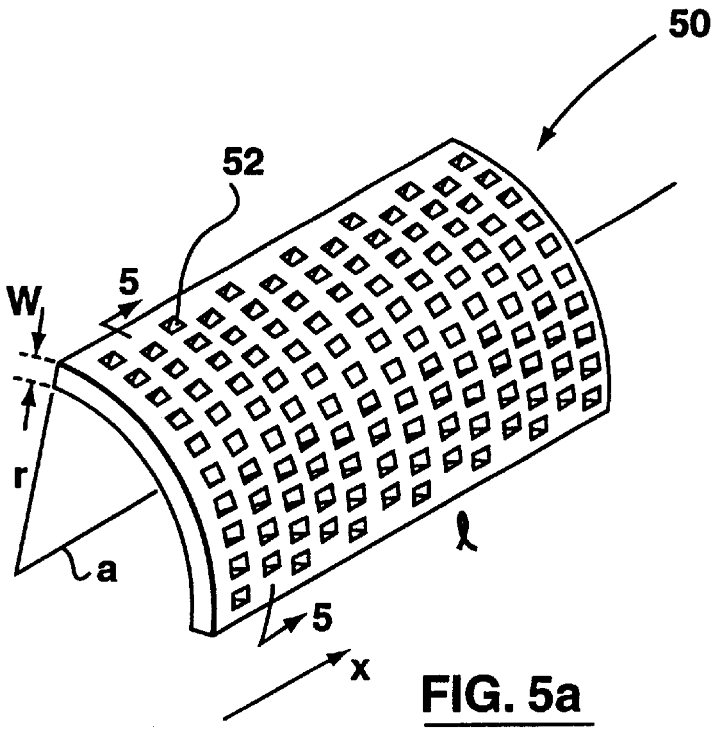
FIG. 5*a* is a diagrammatic perspective view of a rectangular cylinder dynamic collimator made in accordance with an alternative embodiment of the invention.
Figure 5B:
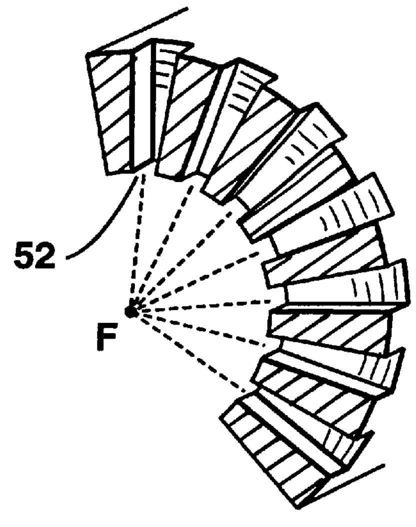
FIG. 5*b* is a sectional view taken along line 5—5 of FIG. 5*a*, showing a column of apertures focused on a point.
Figure 5C:
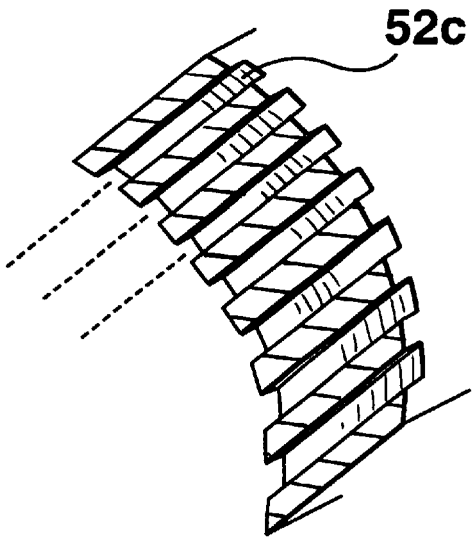
FIG. 5*c* is a cut-off sectional view of an alternative embodiment of the rectangular cylinder collimator shown in FIG. 5*a*, having apertures parallel to each other.

Referring now to FIGS. 5*a*–5*c*, illustrated therein is a rectangular cylinder dynamic collimator made in accordance with an alternative embodiment of the invention, comprising a rectangular cylindrical collimator plate 50, for use with a gamma camera having face with partial or full rectangular cylinder shape. Collimator plate 50 comprises a longitudinally extending section of a wall of a rectangular cylinder of length l, and radius r and thickness w with central cylinder longitudinal axis a. Motion of collimator plate 50, with orientation of the aperture pattern as illustrated in FIG. 5*a*, is linear in parallel with the central cylinder longitudinal axis a. The long axes of the apertures may be parallel to each other or as discussed hereinafter. If the aperture pattern is rotated by 90 degrees within the face of collimator plate 50, then the motion of collimator plate 50 is rotational about axis a. Condition 1 is still satisfied, but on the curved surface of collimator plate 50, and may be called Condition is for non-planar surfaces.

As shown in FIG. 5*b*, apertures 52 are focused on point F, so that collimator plate 50 as a whole is focused on a line, resulting in a fanbeam collimator. Alternatively, apertures 52*c* may be made parallel to each other, resulting in a rectangular cylinder parallel-hole collimator.

Figure 6A:
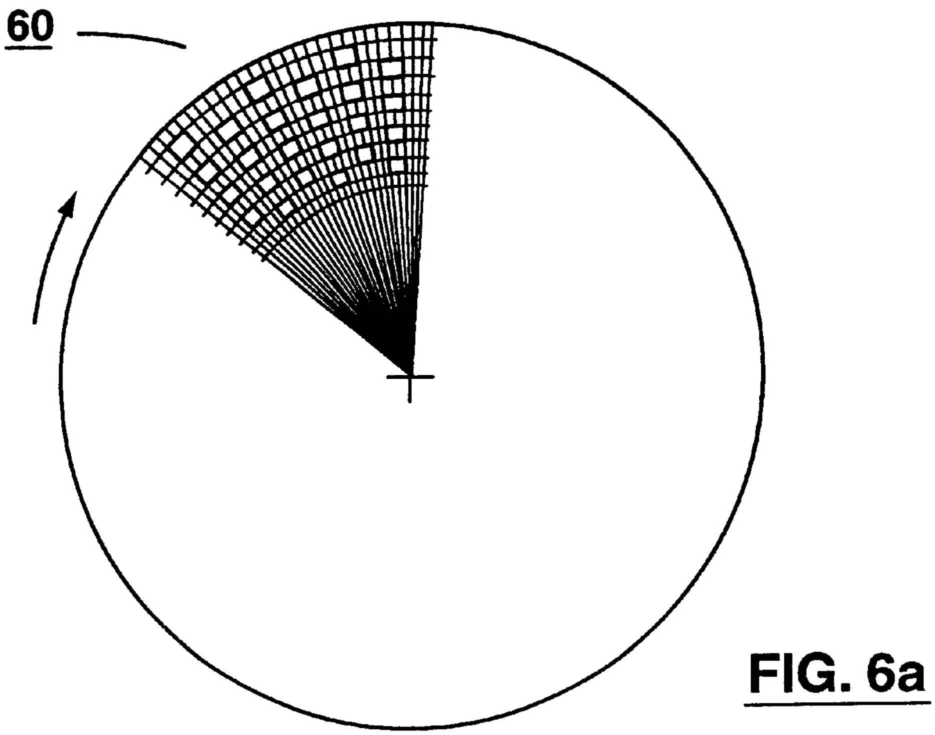
FIGS. 6*a* and 6*b* are diagrammatic front views of two rotational embodiments of the subject dynamic collimator adapted for rotational motion.
Figure 6B:
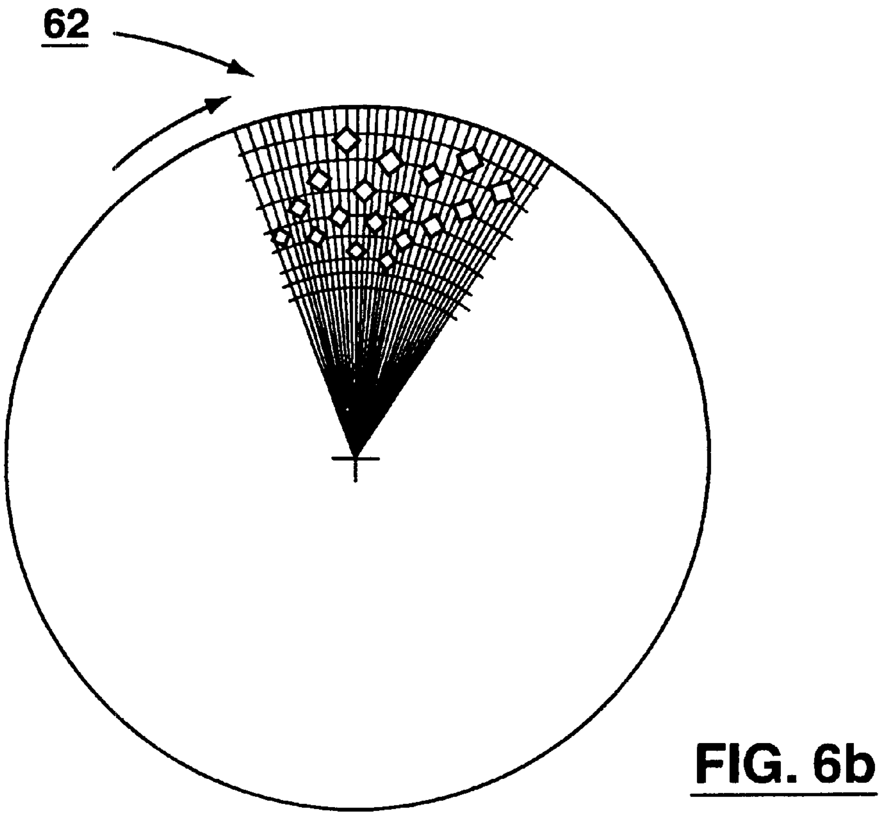

FIGS. 6*a* and 6*b* illustrate dynamic collimators 60, 62 which are the circular equivalents of those in FIGS. 2*a* and 3*b*, respectively. The circular equivalent of Condition 1, call it Condition 1*c*, is that, within each rotationally repeated cell of the pattern, the ratio of distance along the circular arc taken up by apertures to the total distance along the circular arc taken up by collimator is a constant and independent of radial distance and cell. Condition 1*c* must be satisfied for rotation motion to yield uniform image space sampling. No tiling motion in radial and circular arc directions equivalent to tiling motions in x and y-directions is possible if uniform image space sampling is to be accomplished. This is because no repeat of pattern occurs in radial direction. The circular equivalent for the embodiment in FIG. 3*a* follows in the same way. These embodiments require circular motion about an axis through the center and perpendicular to the collimator plane in order to uniformly and completely sample the image space, with the exception that the central aspect of the dynamic collimator cannot be used for imaging. This exception occurs because the apertures cannot be made arbitrarily small, because the center is either an aperture or a septum, and because adequate septum thickness cannot be maintained near the center. Separation of apertures decreases towards the center. This limits how close to the center the apertures can be. To accommodate adequate T at small radial distance, separations at greater radial distance must be proportionally greater, resulting in reduced collimator sensitivity. Since the apertures 15 are smaller closer to the center, provided the outer apertures yield adequate resolution, the entire collimator (except for the small central region) yields adequate resolution for a prior art Anger gamma camera. However, this embodiment does not allow the intrinsic resolution of a fiber optic gamma camera to be realized.

If applied to the production of beams of radioactive or non-radioactive emanations, the above rotational dynamic collimators can be used to produce beams of circular cross-sectional shape and prescribed relative flux at prescribed radius from the center, except for the small region around the center, by means of choice of aperture shapes, sizes, orientations and distribution. For example, in FIG. 6*a*, at any fixed radial distance from the center, except near the center, the radial and circumferential dimensions of apertures 52 and the density or number of such apertures 52 at fixed distance can be manufactured such as to yield specified relative collimator sensitivity at such fixed radial distance, within the resolution of the detecting or imaging system used. This then yields the same relative flux as sensitivity at such radial distance. For certain relative radial sensitivities not all the apertures in adjacent circles may be separated by adequately thick septum. It may still be possible to accommodate by adjusting relative density of apertures in the entire collimator, adjusting aperture location within each such adjacent circle or increasing separation of the circles slightly, within the resolution capabilities of the detecting or imaging system. However, this will place some limitations on relative radial fluxes usable.

Similar control of beam flux as a function of position y can be accomplished with a dynamic collimator used in linear motion mode. For example, in FIG. 2*a*, at any position y, the x and y-dimensions of apertures 15 and the number or density of such apertures in the row defined by y can be manufactured such as to yield specified relative collimator sensitivity in the aperture row defined by position y. This then yields the same relative flux as sensitivity in the aperture row defined by position y. Speed of motion in the same direction can also be varied to yield additional prescribed relative fluxes in the perpendicular direction. The cross-sectional shape and size of such a beam is controllable by an attenuating mask.

Figure 7A:
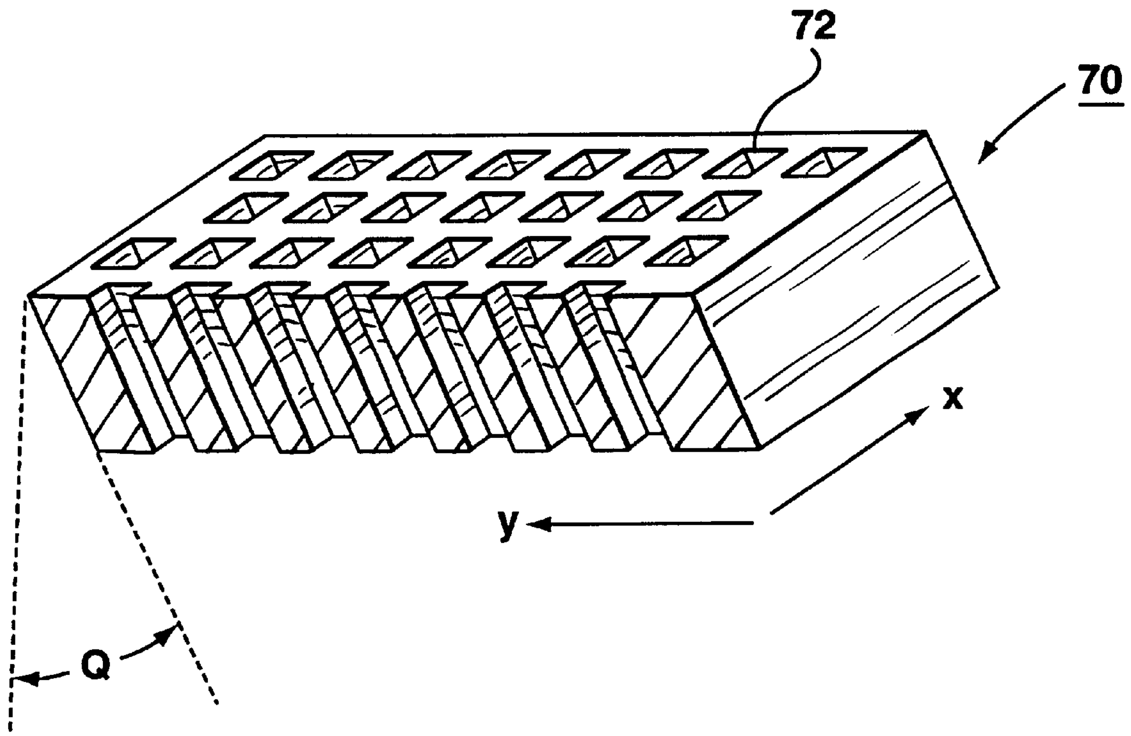
FIGS. 7*a*, 7*b* and 7*c* are diagrammatic perspective cross-cut views of additional alternative embodiments of the subject invention, in which, respectively: the collimator apertures are parallel to each other but slanted at a non-right angle to the collimator face; the collimator apertures focus on a point; and the collimator apertures in any row are parallel to each other, but the apertures in any column focus on a specified line.

A dynamic collimator used with step or continuous linear motion could also have parallel but slanted apertures, like slant-hole collimator 70 illustrated in FIG. 7*a*. This may be an advantage in certain circumstances when imaging with a prior art gamma camera. For example, oblique viewing of the heart at various angles can be accomplished with collimator 70 flat against the chest, reducing distance and thereby improving resolution. However, if used with a fiber optic gamma camera, this would result in unwanted penetration of fibers by the gamma rays (or whatever particles are being used), unless the fibers were slanted in line with the angle of collimator apertures 72. Such a camera could be used effectively only with slant-hole dynamic collimator 70. Nevertheless, there may be circumstances in which imaging or detection by a slant-fiber fiber optic gamma camera fitted with a slant-hole dynamic collimator is advantageous enough to warrant such a system.

Figure 7B:
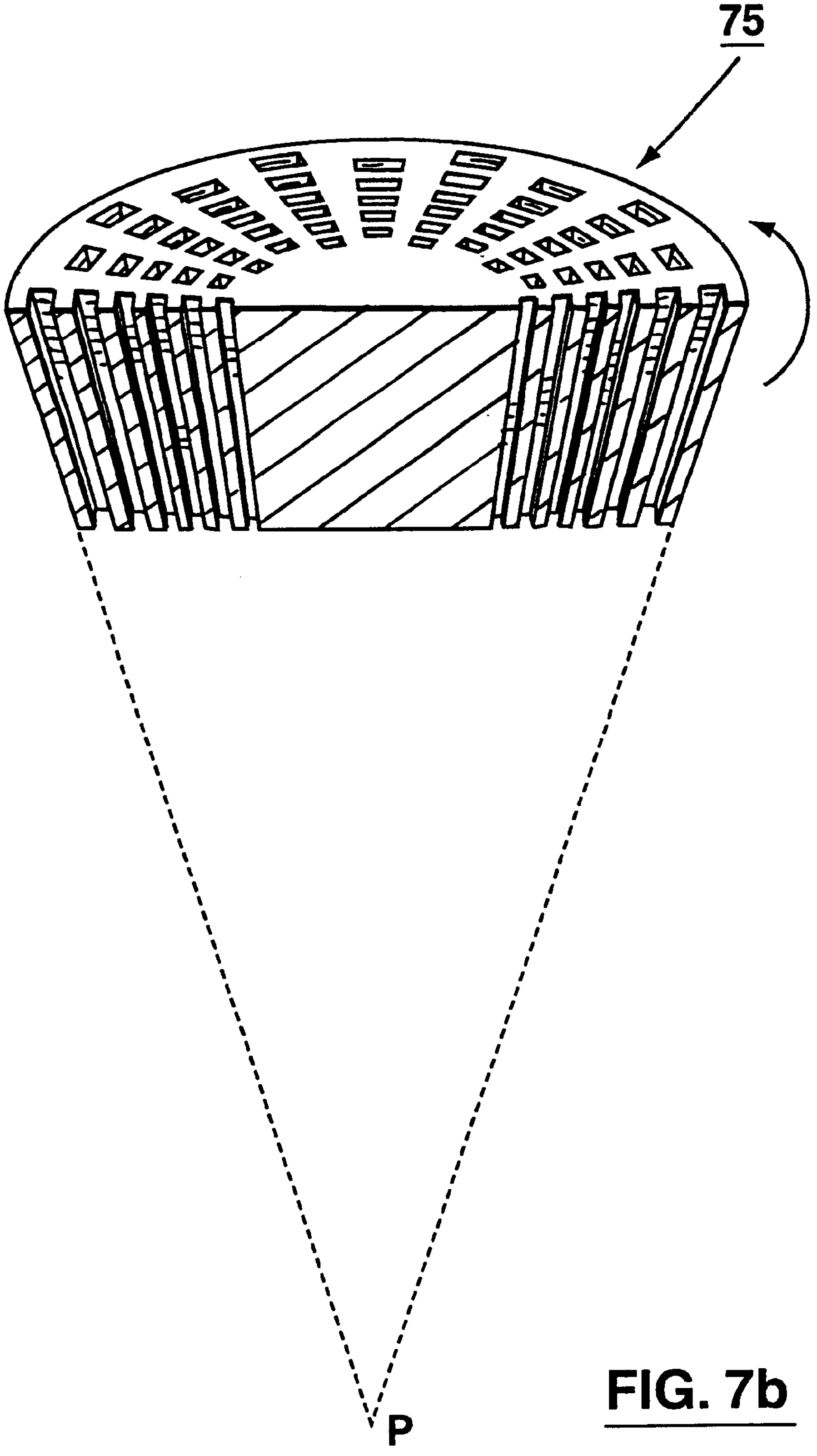

Any other combination of dynamic collimator apertures in line with the scintillation fibers of a fiber optic gamma camera is also conceivable. For example a diverging dynamic collimator 75 as illustrated in FIG. 7*b*, rotating on a (same angle at any given radius) diverging fiber optic gamma camera face could be used to image regions larger than the camera face. Conversely, a converging dynamic collimator (i.e. a diverging dynamic collimator flipped over) rotating on a converging fiber optic gamma camera could be used to get mechanically magnified images. However, magnification is more easily obtained by using a computer-controlled "zoom"mode and parallel-hole dynamic collimator with a parallel-fiber, non-slanted fiber optic gamma camera. Resolution with such a fiber optic gamma camera is probably good enough that mechanically magnified imaging to improve resolution is not needed. As has been discussed above, a rotational dynamic collimator would not allow realization of a fiber optic camera's intrinsic resolution. The geometric distortion produced by divergent and convergent imaging and the restriction of use of diverging and converging fiber optic gamma cameras also make such use undesirable.

Figure 7C:
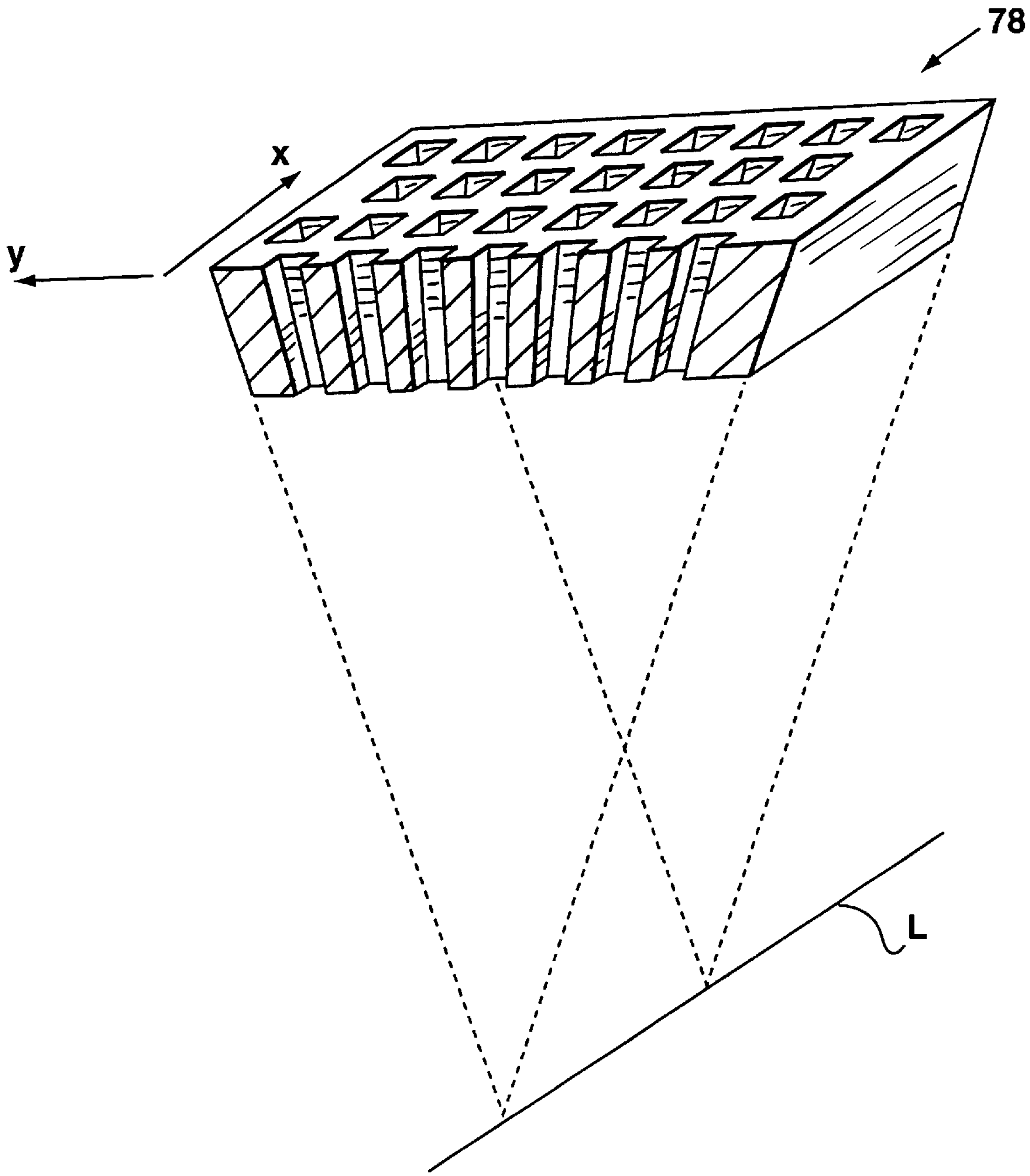

There are circumstances in which prior art collimators are made in a fan-beam design, i.e. with apertures convergent on a line. FIG. 7*c* illustrates an embodiment of a planar dynamic collimator 78 of fan-beam design. The orientation of the aperture pattern with respect to the x and y-axes determines the direction of motion usable. With the pattern illustrated in FIG. 7*c*, motion is in the x-direction. With the inverse pattern (rotated by 90°), but same focal line, motion is in the y-direction, allowing tomographic imaging by focusing in on the plane defined by the moving focal line and blurring the image from other planes above and below.

In the applicant's aforesaid co-pending application it is disclosed that it may be advantageous for SPECT (single photon emission computer tomography) imaging to have a fiber optic gamma camera with a fixed ring of imaging (scintillating) fibers. A dynamic collimator for this would have to be a ring (more precisely a rectangular cylinder, or arcuate part of such, such as is illustrated in FIG. 5a). Motion of the collimator could be by rotation about its axis of symmetry concentrically inside the ring of scintillating fibers. This motion could also be linear in parallel with the central axis of the cylinder, the choice of aperture pattern orientation determining the motion usable. The design of apertures for such a collimator is little different from what has been discussed above for square apertures. If technically feasible, the apertures for such a collimator could be tapered.

Some embodiments of the subject dynamic collimators can be manufactured by prior art foil construction, metal casting, punching or drilling. Other embodiments having apertures of relatively small diameter or certain three dimensional distributions could conceivably be manufactured by using high density fiber optics (e.g. lead glass) with chemically erodible fibers where the apertures are to be, or laser drilling or other means of optical etching (e.g. as disclosed in U.S. Pat. No. 4,125,776). If it is easier to produce thin collimator plates with the desired shape and size apertures, then it may be possible to align enough identical plates to give the needed thickness in the composite collimator.

One possible use of composite collimators is the effective production of very small apertures. Each collimator plate 14 in the composite would be identical and have aperture long axes perpendicular to the collimator face, or at least with long axes parallel to each other. One collimator could be at a slight simple displacement to another collimator, resulting in obscuring part of the aperture openings.

Figure 4:
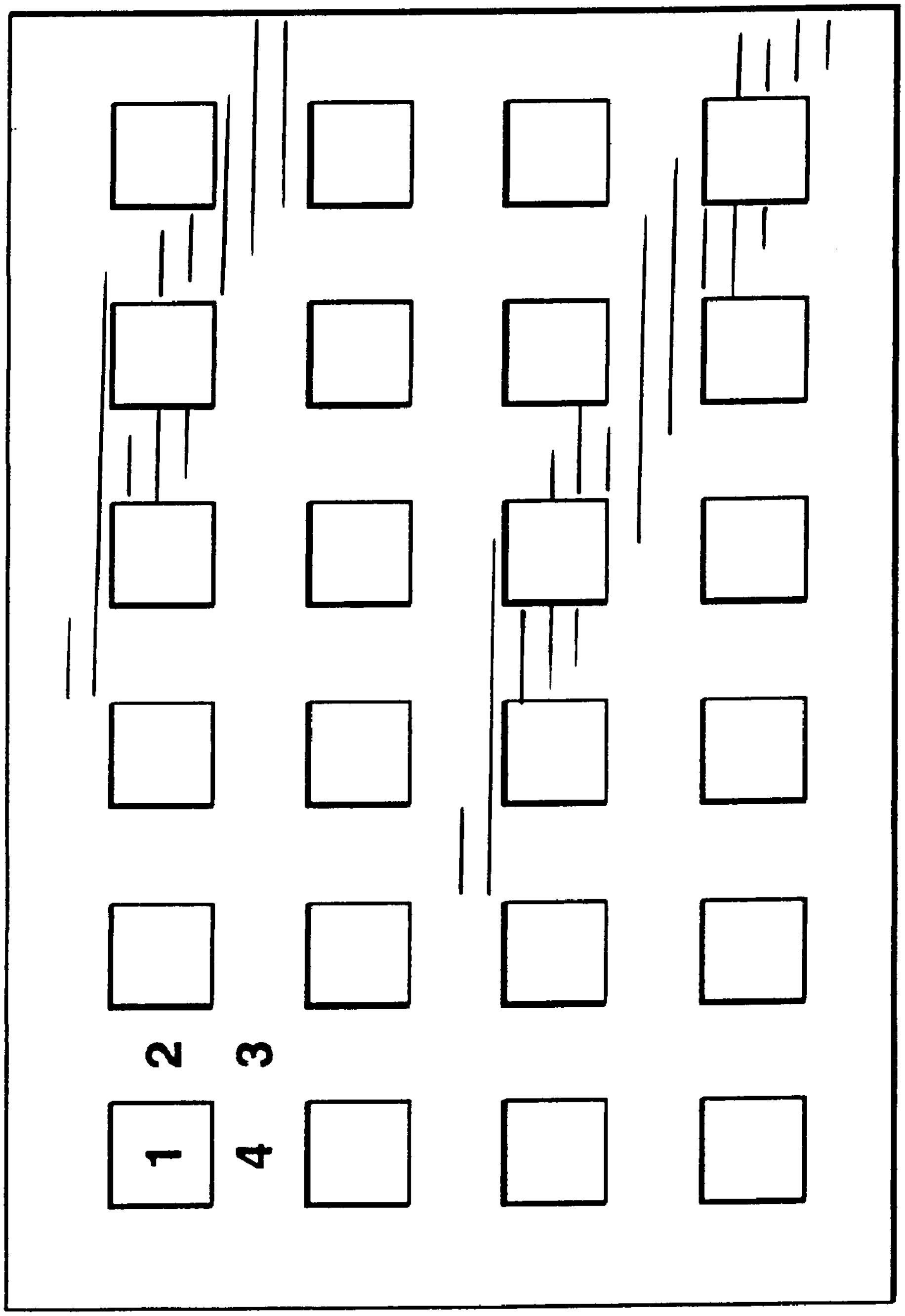
FIG. 4 is a diagrammatic front view of another alternative embodiment of the collimator plate of the subject invention, which requires linear motion in both the x and y-directions.
Figure 8:
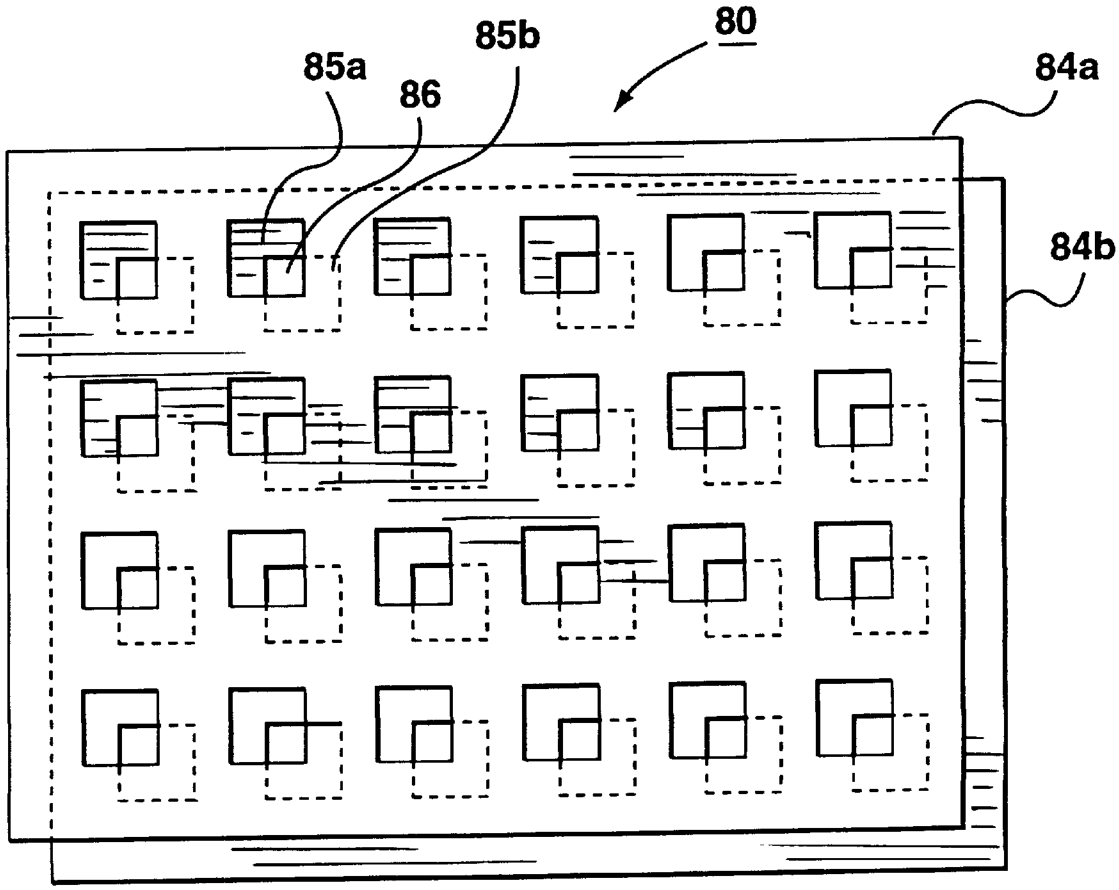
FIG. 8 is a diagrammatic front view of a tandem dynamic collimator made in accordance with the subject invention.

FIG. 8 illustrates two such collimator plates 84a, 84b, each of embodiment illustrated in FIG. 4, and shows, for square apertures 84a, 84b, a slight displacement in line with either diagonal, resulting in effective smaller square apertures 86 for a collimated photon to pass through. This allows adjusting the effective aperture diameters, in much the same way photographic camera shutter apertures are adjusted. The combined collimator unit 80, which may be called a "tandem" collimator, would, as far as the photons are concerned, appear to be a single dynamic collimator of embodiment illustrated again in FIG. 4, but with smaller square apertures a bit further apart and still perpendicular to the collimator face (or still at the same angle, if the individual dynamic collimators were slant hole dynamic collimators). The same effect could be accomplished with multiple thin collimator plates aligned appropriately. This may be an easier and therefore cheaper method of production, for any embodiment of dynamic collimator. Unless designed for a specific final aperture size and distribution, this tandem dynamic collimator would, of course, have to have its sampling motion adjusted in both x and y-directions to maintain complete and uniform image space. All this could be under automatic computer control, once a desired resolution is chosen. If the resultant tandem collimator has effective septum thickness a multiple of effective aperture diameter, as illustrated in FIG. 8, then the required motion is as described before and fairly simple. This is the simplest type of tandem collimator to use. Such an adjustable-resolution tandem dynamic collimator would only be necessary if it were difficult to produce a single dynamic collimator with the desired resolution.

Embodiments other than that illustrated in FIG. 4 can also be used in combination to make tandem dynamic collimators. In general, however, for these, the resultant tandem dynamic collimator is of an embodiment requiring motion not just of different magnitudes in the x and y-directions but of a different pattern than that of the original embodiment used. Tandem dynamic collimators with non-square apertures result from non-diagonal relative displacement of the collimator plates, each with square apertures, or from use of collimator plates with non-square apertures. Such embodiments of tandem dynamic collimators, in general, require complicated motions or are not usable as dynamic collimators.

Combinations of dynamic collimators and prior art collimators are possible. A dynamic collimator with apertures of larger diameter than in a prior art parallel-hole collimator can be used to pre-collimate gamma rays for the prior art collimator. The pre-collimation effectively results in longer pathways travelled by the gamma rays through the septa of the prior art collimator. Therefore, if the gamma rays are of higher energy than the prior art collimator can on its own collimate to yield good resolution, the pre-collimation allows good resolution, equal to that if the prior art collimator were used alone with lower energy gamma rays. Combinations such as this of dynamic and prior art collimators can be used to much the same effect as dynamic collimators with apertures the same size as those of the prior art collimator.

Ultimately, the design of a dynamic collimator 10 will be limited by technical capabilities (e.g. size and shape of apertures) and practical limits (e.g. imaging time for low sensitivity collimators, cost of collimators). But, in theory, the apertures 15 can be arbitrarily small, of any of a large number of shapes and in a large number of arrays, provided the sensitivity and uniformity are acceptable. However, the embodiment illustrated in FIG. 2a, besides yielding uniform image space sampling and utility with prior art gamma cameras, also yields the desirable properties: (a) maximum sensitivity for dynamic collimators 10 with aperture 15 diameter d; (b) usable with a fiber optic gamma camera, allowing the camera's intrinsic resolution to be achieved; and (c) simple linear motion. None of the other embodiments discussed yield all these, so the embodiment illustrated in FIG. 2a is the preferred one.

For fixed length of aperture 15 and adequate septum thickness T, dynamic collimator 10 resolution is determined solely by diameter d of aperture 15. Prior art parallel-hole collimator resolution is determined by distance between centers of apertures and, for given aperture length, is limited by septum thickness. Sensitivity for both prior art parallel-hole collimators and dynamic collimators is determined, for fixed acceptance angle, by the ratio of total aperture area to total collimator area. Therefore, sensitivity of a dynamic collimator can be increased by reducing septum thickness, without affecting resolution, provided septum thickness remains great enough to stop (an adequate portion of) the gamma rays. A dynamic collimator for low energy photons can have thinner septa and therefore higher sensitivity than one for high energy photons, and yet have the same resolution. This allows production of same resolution dynamic collimators for different energy photons, all having maximum sensitivity for the energy (photons) under consideration. If cost is not a problem, but patient throughput is, then having such a set of dynamic collimators for desired resolution would be helpful.

The low sensitivity of dynamic collimators with improved resolution is, for the most part, and more-so for higher energy gamma rays, offset by the higher sensitivity of a fiber optic gamma camera (sensitivity increases exponentially with scintillating fiber length), as is disclosed in the applicant's aforesaid co-pending application. Dynamic collimators can also be used with prior art Anger gamma cameras, but, because of low sensitivity of these cameras for higher energy gamma rays, the improved resolution (i.e. smaller aperture size) of the dynamic collimators must be limited to keep imaging time acceptable if using diagnostic doses of high energy gamma ray emitters. With therapeutic doses this is much less of a problem.

Dynamic collimators can also be used to collimate particles (ionized or non-ionized) in a wide beam with uniform flux (averaged over time) across the beam. This would be useful in high-energy physics and in nondestructive inspection (by imaging) of materials (e.g. with neutrons or x-rays). Combining a dynamic collimator with a fiber optic imaging camera designed specifically to respond to thermal neutrons and not to x-rays or gamma rays (e.g. U.S. Pat. No. 5,308,986 discloses an example of chemical composition and fiber production technique to accomplish this) would yield very high resolution thermal neutron images of materials. Nuclear fuel rods could also be imaged with high resolution to check on uniformity and distribution of radioactive materials in them. The resolution (i.e. aperture size) here must also be limited so that the flux of the final collimated particle beam is greater than some acceptable lower limit. For slow particles the translational or rotational speed of the dynamic collimator would have to be slow enough to allow most of the particles entering an aperture, and with direction parallel to the aperture axis, through without touching the walls of the aperture.

In all the embodiments of a dynamic collimator, the speed of motion must be slow enough that most gamma rays (or whatever particles are being used) entering an aperture, and with direction parallel to the aperture axis, exit the other end without touching the walls. For photons travelling at speed $3\times10^{10}$ cm/s the speed of translation or rotation of the dynamic collimator can be any value up to a fairly large one. The lower limit of speed is such that the entire image space is sampled within acceptable time. For most situations this allows for a wide range of acceptable speeds.

It should be understood that various modifications can be made to the preferred embodiments described and illustrated herein, without departing from the subject invention, the scope of which is defined in the appended claims.

I claim:

1. Apparatus for collimating particle emanations, comprising:

(a) a collimator plate made of an attenuating material capable of attenuating particle emanations, the collimator plate having a plurality of apertures of pre-selected cross-sectional shape and three-dimensional distribution for restricting the emanations to pass through in a plurality of defined collimated beams; and (b) motion means operatively coupled to the collimator plate for moving the collimator plate as a whole relative to an emanation detector during a detection time, in a manner which enables the plurality of collimated beams to form a defined combined beam during the detection time yielding a pre-selected detector cross-sectional sampling of the emanations within an image space;

(c) wherein the collimator face is described by coordinates x and y, and the apertures are of such cross-sectional shape and distribution that the ratio of distance occupied by the apertures in the x-coordinate direction of motion to the distance traveled by the collimator as a whole in the x-coordinate direction during the detection time is essentially a constant, independent of y, for y orthogonal to x.

2. The apparatus defined in claim 1, wherein the collimator plate is planar and has:

(a) a beam exit face within a specified x-y plane having an x-axis defining distance in an x-direction and a y-axis perpendicular to the x-axis defining distance in a y-direction; and (b) wherein the apertures in cross-section in the x-y plane are:

(i) arranged in rows and columns;

(ii) aligned in a specified direction with respect to the x-axis and the y-axis; and (iii) arranged in a pattern of repeating cells of apertures extending a linear distance in the x-direction and y-direction, wherein the linear distance in the x-direction occupied by apertures in each of the cells is a constant, independent of the distance in the y-direction.

3. The apparatus defined in claim 2, wherein the apertures are arranged with central long axes:

(i) parallel to each other; and (ii) at a specified three-dimensional angle to the x-y plane.

4. The apparatus defined in claim 2, wherein the apertures are arranged:

(i) in rows, specified by position y, with central long axes parallel to each other; and (ii) in columns, specified by position x, with the central long axes convergent on a specified line coplanar with the x-axis and parallel to the x-y plane, and with the apertures tapered in the plane specified by each column, proportionally to the separation of their central long axes.

5. The apparatus defined in claim 2, wherein the apertures are arranged:

(i) in rows, specified by position y, with central long axes convergent on a specified line coplanar with the y-axis and parallel to the x-y plane, and with apertures tapered in the plane specified by each such row in proportion to the separation of their central long axes; and (ii) in columns, specified by position x, with central long axes parallel to each other.

6. The apparatus defined in claim 1, wherein the collimator plate is a shell section of a rectangular cylinder, having a central axis, straight sides and length parallel to the central axis, and a curved beam exit face lying in a curvilinear plane defined by x and y curvilinear orthogonal coordinates embedded in the beam exit face such that one of x, y is specified as parallel to the central axis and with the apertures:

(a) in cross-section on the beam exit face being:

(i) arranged in rows and columns specified by the x and y coordinates, respectively;

(ii) aligned in a specified direction with respect to the x and y coordinates; and (iii) arranged in a pattern of repeating cells of apertures extending in curvilinear distance along the x and y curvilinear coordinates, wherein the distance along the x coordinate occupied by apertures in each of the cells is a constant, independent of y.

7. The apparatus defined in claim 6, wherein the apertures are arranged with long axes:

(i) parallel to each other; and (ii) at a specified three-dimensional angle to the curvilinear x-y plane.

8. The apparatus defined in claim 6, wherein the apertures are arranged:

(i) in rows, specified by position y, with central long axis parallel to each other; and (ii) in columns, specified by position x, with central long axes convergent on a specified line parallel to the central axis, and with apertures tapered in the plane specified by each column, proportionally to the separation of their central axes.

9. The apparatus defined in claim 2, wherein the apertures have cross-sections in the beam exit face which are;

(a) of diameter d in the x-coordinate;

(b) separated by collimator septa of at least specified thickness T; and (c) arranged in patterns of repeating cells with specified separation $t \geqq T$ of apertures in the x-coordinate and, thereby, with specified minimal cell x-coordinate dimension t+d.

10. The apparatus defined in claim 9, wherein the apertures have crosssections in the beam exit face which are:

(a) square, with sides parallel to the x and y-coordinates; and (b) positioned such that, except for the edges of the collimators where cells are incomplete;

(i) there is zero separation along the y-coordinate of adjacent rows of apertures; and (ii) for any chosen aperture, the next nearest aperture in the adjacent row in negative y-coordinate direction is separated in the positive x-coordinate direction from the chosen aperture by distance T=nd, where n is a positive integer, with the result that apertures in any row are separated by distance $t=[(n+1)^2-1]d$ along the x-coordinate.

11. The apparatus defined in claim 10, wherein n=1.

12. The apparatus defined in claim 9, wherein the motion means moves the collimator plate in specified x-coordinate direction at specified constant speed through a distance that is a specified multiple of t+d.

13. The apparatus defined in claim 9, wherein the motion means moves the collimator plate in specified x-coordinate direction in steps:

(a) of specified size md, where $0<m<2$;

(b) with time allotted for detection at each step a specified constant; and (c) with total distance covered a specified multiple of t+d, with the result that the sampling of emanations within the image space is uniform for m=1 and substantially uniform otherwise.

14. The apparatus defined in claim 13, wherein the motion is repeated in specified combination of positive and negative x-coordinate directions, the last repeat not necessarily complete.

15. The apparatus defined in claim 1, wherein the collimator plate is planar and has:

(a) a beam exit face in a specified x-y plane; and (b) the apertures in cross-section in the x-y plane are:

(i) arranged in concentric rings and radial columns, thereby defining a central axis;

(ii) arranged with septum thickness at least specified value T; and (iii) arranged in a pattern of repeating cells of apertures around any ring, such that, the fraction of distance along any circular arc occupied by apertures in each of the cells is a constant, independent of radial distance from the center, except for a central portion in which there are no apertures.

16. The apparatus defined in claim 15, wherein the apertures are arranged with their central long axes parallel to the central axis of the collimator aperture pattern.

17. The apparatus defined in claim 15, wherein the apertures are arranged with their central long axes convergent on a specified point, and with the apertures tapered in proportion to the separation of their central long axes.

18. The apparatus defined in claim 15, wherein the motion means rotates the collimator plate about the central axis at a constant speed.

19. The apparatus defined in claim 1, wherein the apertures have a maximum diameter less than half the linear resolution capability of apparatus used to detect the collimated beams.

20. The apparatus defined in claim 1, wherein the collimator plate is planar and has:

(a) a beam exit face within a specified x-y plane; and (b) the apertures in cross-section in the x-y plane:

(i) are square, with sides of specified linear size d, and oriented with sides parallel to the x and y-axes;

(ii) arranged in rows and columns separated in each row and each column by distance T=nd, n a positive integer; and (c) the apertures have central long axes parallel to each other and at a specified three-dimensional angle to the x-y plane.

21. The apparatus defined in claim 20, wherein the motion is linear, of constant speed, in positive x-direction, through distance (n+1)d, followed by a step in the negative y-direction and repeat of the motion in negative x-direction, followed by another step in the negative y-direction and repeat of the motion in the positive x-direction, and so on until n+1 rows have been passed over, with repeat of this whole process a specified multiple number of times, the last of which need not necessarily be complete.

22. The apparatus defined in claim 1, wherein the collimator plate comprises at least two stacked plate members, the stacked plate members comprising at least a first plate member having first apertures arranged in a pre-selected plate aperture pattern and a second plate member adjacent the first plate member having second apertures arranged in the preselected plate aperture pattern, wherein the plate members are displaced relative to each other such that the first apertures are offset diagonally from the second apertures in a specified direction and by a specified amount, resulting in obscuring part of the apertures and forming an aperture pattern for the collimator plate similar to the pre-selected plate aperture pattern, but with smaller apertures.

23. The apparatus defined in claim 1, wherein the apertures are arranged in a two-dimensional pattern extending in a first direction along a first axis and a second direction along a second axis not perpendicular to the first axis, the pattern comprising a repeating unit cell of apertures, wherein within the unit cell of the pattern, the ratio of the distance along the first axis taken up by the apertures to the total distance in the first direction taken up by the pattern is a constant independent of second direction.

24. The apparatus defined in claim 1, wherein the motion means comprises a motor operatively coupled to the collimator plate, and an electronic controller for controlling the operation of the motor.

25. Apparatus for collimating particle emanations, comprising:

(a) a collimator plate having a plurality of apertures of pre-selected cross-sectional shape and three dimensional distribution, wherein the apertures are separated by septa made of a material capable of attenuating the particle emanations;

(b) a motor operatively coupled to the collimator plate for moving the collimator plate relative to an emanation detector during a detection time in a pre-determined manner of motion; and (c) wherein the cross-sectional shape and the three-dimensional distribution are selected relative to the pre-determined manner of motion so as to achieve a substantially uniform sampling of the emanations within a pre-determined image space, as the motor moves the collimator plate during the detection time.

26. The apparatus defined in claim 25, wherein the manner of motion comprises movement in a direction of travel, and the shape and the distribution of the apertures are selected such that the ratio of the distance occupied by the apertures along an axis aligned with the direction of travel to the distance traveled by the collimator plate during the detection time is a constant throughout the collimator plate.

27. The apparatus defined in claim 25, wherein the collimator plate is planar and has:

(a) a beam exit face within a specified x-y plane having an x-axis defining distance in an x-direction and a y-axis perpendicular to the x-axis defining distance in a y-direction; and (b) wherein the apertures in cross-section in the x-y plane are:

(i) arranged in rows and columns;

(ii) aligned in a specified direction with respect to the x-axis and the y-axis; and (iii) arranged in a pattern of repeating cells of apertures extending a linear distance in the x-direction and y-direction, wherein the linear distance in the x-direction occupied by apertures in each of the cells is a constant, independent of the distance in the y-direction.

28. The apparatus defined in claim 25, wherein the collimator plate is planar and has:

(a) a beam exit face in a specified x-y plane; and (b) the apertures in cross-section in the x-y plane are:

(i) arranged in concentric rings and radial columns, thereby defining a central axis;

(ii) arranged with septum thickness at least specified value T; and (iii) arranged in a pattern of repeating cells of apertures around any ring, such that, the fraction of distance along any circular arc occupied by apertures in each of the cells is a constant, independent of radial distance from the center, except for a central portion in which there are no apertures.

29. The apparatus defined in claim 25, wherein the collimator plate comprises at least two stacked plate members, the stacked plate members comprising at least a first plate member having first apertures arranged in a preselected plate aperture pattern and a second plate member adjacent the first plate member having second apertures arranged in the preselected plate aperture pattern, wherein the plate members are displaced relative to each other such that the first apertures are offset diagonally from the second apertures in a specified direction and by a specified amount, resulting in obscuring part of the apertures and forming an aperture pattern for the collimator plate similar to the pre-selected plate aperture pattern, but with smaller apertures.

30. The apparatus defined in claim 25, wherein the apertures are arranged in a two-dimensional pattern extending in a first direction along a first axis and a second direction along a second axis not perpendicular to the first axis, the pattern comprising a repeating unit cell of apertures, wherein within the unit cell of the pattern, the ratio of the distance along the first axis taken up by the apertures to the total distance in the first direction taken up by the pattern is a constant independent of second direction.

31. The apparatus defined in claim 25, wherein the motor comprises an electric motor operatively coupled to the collimator plate, and an electronic controller for controlling the operation of the electric motor during the detection time.

* * * * *